United States Patent
Ross

(10) Patent No.: US 10,028,484 B2
(45) Date of Patent: Jul. 24, 2018

(54) PORTABLE WATER TRAVEL BOTTLE FOR USE TO PROVIDE WATER TO DOGS IN AUTOMOBILES AND OTHER LOCATIONS REMOTE FROM HOME

(71) Applicant: Gary Ross, Oxnard, CA (US)

(72) Inventor: Gary Ross, Oxnard, CA (US)

(*) Notice: Subject to any disclaimer, the term of this patent is extended or adjusted under 35 U.S.C. 154(b) by 0 days.

(21) Appl. No.: 14/828,439

(22) Filed: Aug. 17, 2015

(65) Prior Publication Data

US 2016/0050884 A1     Feb. 25, 2016

Related U.S. Application Data

(60) Provisional application No. 62/038,805, filed on Aug. 18, 2014.

(51) Int. Cl.
*A01K 7/00* (2006.01)
*B65D 37/00* (2006.01)

(52) U.S. Cl.
CPC ....................................... *A01K 7/00* (2013.01)

(58) Field of Classification Search
USPC ... 119/74, 51.5, 61.5, 61.54–61.56, 72, 900;
D30/121, 132, 129; 215/DIG. 7;
222/207
See application file for complete search history.

(56) References Cited

U.S. PATENT DOCUMENTS

| | | | | |
|---|---|---|---|---|
| 2,543,427 A | * | 2/1951 | Warne | B65D 41/26 141/381 |
| 3,246,807 A | * | 4/1966 | Micallef | G01F 11/286 222/207 |
| 3,581,953 A | * | 6/1971 | Donoghue | B65D 35/40 222/207 |
| 4,106,673 A | * | 8/1978 | Donoghue | G01F 11/286 222/207 |
| 4,146,154 A | * | 3/1979 | Mastman | A47K 5/122 222/109 |
| 4,273,247 A | * | 6/1981 | Earls | B65D 41/26 141/380 |
| D300,477 S | * | 3/1989 | Terbush | D30/130 |
| 5,350,078 A | * | 9/1994 | Potts | B65D 23/102 215/384 |
| D358,296 S | * | 5/1995 | Garneau | D7/510 |
| 5,762,120 A | * | 6/1998 | Smith | B67C 11/02 141/331 |
| 5,809,935 A | * | 9/1998 | Kolterman | A01K 7/02 119/74 |
| D400,316 S | * | 10/1998 | Kolterman | D30/129 |

(Continued)

*Primary Examiner* — Andrea Valenti
(74) *Attorney, Agent, or Firm* — Thomaa I. Rozsa

(57) ABSTRACT

A portable travel mug and water bowl combination which is used to retain water and dispense water for a dog to consume and thereafter enable the unconsumed water to be returned to the travel mug. The water bottle contains an upper section, a lower section and an interior recessed section which enables the bottle to be compressed to squeeze water out of the bottle through a straw into the dog bowl and at the same time provide a sufficient stiffness so that the shape of the bottle will not deform. The water bottle is designed to be fit into and retained in a standard car beverage container holder. The device is also designed to be aesthetically pleasing so that it can even be used in luxury vehicles.

3 Claims, 8 Drawing Sheets

(56) References Cited

U.S. PATENT DOCUMENTS

| | | | | |
|---|---|---|---|---|
| 5,992,702 A * | 11/1999 | Shapiro | ............ | A01K 7/00 222/192 |
| D427,909 S * | 7/2000 | Doritty | ............ | D9/500 |
| 6,209,737 B1 * | 4/2001 | Bliss | ............ | B65D 23/065 215/228 |
| 6,223,792 B1 * | 5/2001 | Slagle | ............ | B65D 47/243 141/311 R |
| 6,293,226 B1 * | 9/2001 | Hwang | ............ | A01K 7/06 119/72 |
| 6,718,911 B2 * | 4/2004 | Greenberg | ............ | A01K 7/00 119/51.5 |
| D540,124 S * | 4/2007 | Ross | ............ | D7/509 |
| D566,468 S * | 4/2008 | Sandy | ............ | D7/509 |
| 7,681,754 B1 * | 3/2010 | Ross | ............ | A47G 19/2272 215/387 |
| 7,690,329 B2 * | 4/2010 | Parks | ............ | A01K 7/00 119/72 |
| D706,582 S * | 6/2014 | Oas | ............ | D7/510 |
| 8,807,083 B1 | 8/2014 | Ross | | |
| D729,583 S * | 5/2015 | Lapsker | ............ | D7/510 |
| D741,025 S * | 10/2015 | Ross | ............ | D30/121 |
| 2004/0265525 A1 * | 12/2004 | Bean | ............ | D04H 1/64 428/36.3 |
| 2007/0062973 A1 * | 3/2007 | Sochacki | ............ | B65D 23/08 222/175 |
| 2008/0087224 A1 * | 4/2008 | Wechsler | ............ | A01K 7/00 119/52.1 |
| 2008/0115732 A1 * | 5/2008 | Stenberg | ............ | A01K 7/02 119/74 |
| 2008/0277374 A1 * | 11/2008 | Miura | ............ | B65D 1/0223 215/384 |
| 2009/0107582 A1 * | 4/2009 | Sayage | ............ | B65D 51/24 141/340 |
| 2010/0313817 A1 * | 12/2010 | Krasner | ............ | A01K 7/00 119/72.5 |
| 2010/0314418 A1 * | 12/2010 | Roth | ............ | B65D 41/26 222/205 |
| 2012/0298045 A1 * | 11/2012 | Wechsler | ............ | A01K 7/00 119/52.1 |

* cited by examiner

PORTABLE WATER TRAVEL BOTTLE FOR USE TO PROVIDE WATER TO DOGS IN AUTOMOBILES AND OTHER LOCATIONS REMOTE FROM HOME

CROSS-REFERENCE TO RELATED APPLICATION

This patent application claims priority to Provisional Application No. 62/038,805 filed on Aug. 18, 2014, now pending.

BACKGROUND OF THE INVENTION

1. Field of the Invention

The present invention relates to the field of providing drinking water for a dog, especially when traveling with the dog in a vehicle such as a car, truck, SUV, camper, etc. The present inventor Gary Ross is the inventor of U.S. Pat. No. 8,807,083 issued on Aug. 19, 2014 for "PORTABLE WATER TRAVEL MUG FOR DOGS".

2. Description of the Prior Art

It is very common for people to travel with a dog in a vehicle such as a car. Sometimes the dog is being taken to a veterinarian, but many times the dog is a constant companion and therefore must ride in the car with the owner. Dogs, just as humans, must have access to water, especially in summer heat.

Beginning at least as early as the 1980s, every car has a place to retain a drinking vessel, a drink holder for coffee, or a water bottle. Most vehicles have side-by-side or front and back drink vessel holders. A vehicle commonly has only one occupant who is the driver and therefore, there is an extra drink holder adjacent the driver's seat.

Most dogs will travel in the front seat of a car if they are only traveling with the owner. The owner can have a cup of coffee, tea or a bottle of water in a drink holder. However, there is no convenient retainer to retain drinking water for the dog.

One solution in the prior art is a travel water bowl which is placed on the floor of the vehicle. However, if the water placed in the travel bowl is not entirely consumed, normal driving will cause the water to splash and cause water to splash onto the car's carpet. This is not very practical.

Alternatively, the driver can stop the vehicle, pour water into a bowl, and after the dog has finished drinking, throw out the unfinished water. This may be illegal in some places and certainly is very inconvenient.

U.S. Pat. No. 8,807,083 for "PORTABLE WATER TRAVEL MUG FOR DOGS" by the present inventor essentially consists of the water mug having an exterior protective shell with removable disks to enable a user to insert the user's thumb and another finger such as a forefinger on opposite sides of the opening leading directly to the mug or bottle to enable the user to squeeze the bottle so that water is squeezed out of the bottle and into a dog water dish as described in the application to be issued as the above-referenced patent. The present invention is an improvement over that innovation removing the outer shell and the necessity to remove protective disks from the outer shell to gain access to the mug in order to be able to squeeze water from the mug into a drinking cup.

There is a significant need for a convenient and practical way to carry water to enable a dog to have a drink of water while a person is driving a car or after the car is pulled over for a stop and provide a means to safely store any water not consumed by the dog.

SUMMARY OF THE INVENTION

The present invention is a portable travel mug and water bowl combination which is used to retain water and dispense water for a dog to consume and thereafter enable the unconsumed water to be returned to the travel mug. The present invention is designed to fit into and be retained in standard car beverage container holders. The device is also designed to be aesthetically pleasing so that it can even be used in luxury vehicles.

The issued U.S. Pat. No. 8,807,083 shows an outer body having a protective shell with removable disks which can be removed to create openings in the shell to allow a user to access a squeeze bottle within the shell. It has cosmetic value and directs the user for the function but it has been discovered by the present inventor of the same invention that if the outer protective shell is removed, then it facilitates direct contact with the bottle or travel mug. However, the present inventor has also noticed that the direct contact with the bottle or mug leads to a possible slippery or too soft (squishy) structure.

If the bottle is redesigned to be constricted with a waist in it, it will have additional rigidity and then when a user squeezes the bottle, the entire bottle will not flex or collapse in shape. It has been discovered that a one inch recess in the bottle that stiffens the bottle allows any slight pressure on the exterior surface of the bottle to transfer the water from the interior of the bottle to go up an interior straw and into the drinking bowl at the top of the bottle. The recess acts to give three different places to squeeze the bottle, the bottom section, the middle and the top of the bottle, The recess creates these different options. A standard size silicone band with wording can also be added to promote an event in this recess.

The bottom of the bottle can also be squeezed. Therefore, this defines two places to squeeze. It is possible to also add a base of stainless steel on the bottom to stiffen the bottle without the groove or covering the groove as shown. The device can also have a cup and if the cup is stainless or plastic, it is removable and could be used to fill the bottle from drinking fountains which always have a very low stream of water. By removing the top, the opening is exposed to more easily fill the bottle with fresh water.

The combination water retainer and water drinking bowl includes a drinking bowl top which is affixed to the water retaining vessel. In a preferred embodiment, the water retaining vessel is a plastic squeeze bottle which, by way of example, can retain approximately sixteen (16) ounces of liquid such as water. The exterior surface has an upper section with a multiplicity of dimples which are oppositely disposed from each other so that a person can squeeze the exterior of the bottle at the location of the upper dimples to squeeze water out of the bottle and into the drinking cup. In addition, the lower section which does not necessarily have any specific dimples also permits the individual to directly grasp the exterior surface of the bottle and squeeze so that water can exit the bottle in a manner to be discussed and pressure from the oppositely disposed fingers approximately 180 degrees apart on the lower section of the squeeze bottle also facilitates water to be squeezed up through an interior straw and into the dog bowl.

A key improvement in the exterior structure of the new, redesigned water bottle is that between the first top section which contains the dimples to direct an individual where to squeeze the bottle and the lower section that does not have dimples but also enables an individual to directly squeeze the bottle is a constricted or reduced diameter area. This reduced diameter area or waist provides more rigidity so that when squeezing the bottle, the entire will not flex, losing the compression to just change the outside shape of the bottle.

An additional improvement is to create a strap which is located at the reduced diameter section of the bottle. The strap can have a metal section which enables the strap to be hooked onto a dog's collar or to be hooked onto another object in the car. The strap can be used to secure the bottle to a bicycle or on a backpack in two different ways, attached to the bowl or on the narrow waist of the mug. In addition, the diameter and circumference of the squeeze bottle is sufficient to be retained in a cup or bottle holder within a car. The strap can hold other objects to the bottle such as a cell phone, a pen or create a handy flexible handle if around the bowl. By way of example, the interior groove or recess can be 60 mm. high and 70 mm. in diameter on the top and about 65 mm. outer diameter on the bottom of the plastic cup located on a rib within the bottle. The rib outer diameter is about 69 mm. wide and cut into current blow molded tooling. It will be located on the bottle about 25 mm. below the transition from the sidewall to the recessed wall. The other diameter of the outside bottle of the cup is about 65 mm.

Another advantage created by the present invention is to have a wide top of 53 mm. as it is easy to add water and even ice to keep the water cooler. Water in a standard bottle has a standard 28 mm. top with different threads. The present inventor has created making a softer silicone insert into the wide ring 53 mm. top. The silicone part will screw into the threads and be constrained. Silicone is a gasket material and a preferred choice for the present invention. It can also be used for the concept of making threads for a standard opening of a water bottle in addition to the widened opening of the 53 mm. top as discussed above. The uniqueness of the present invention is that the insert will accommodate and make watertight other threads.

The water cup has within it a lower section containing interior threads which mate with exterior threads on the water bottle and has the silicone insert which serves the purposes as just discussed, and then a central receiving opening to receive a straw and retain the straw as it extends into the water within the water bottle. The water bowl also can contain a section with an opening to receive a dog tag or other dog identification item; or other dog identification apparatus or a standard carabineer to attach to a backpack for hiking.

The water bowl can have a straight circumferential top or have a top that is at an angle to facilitate drinking from the bowl. The top optionally can have a silicone rim to prevent dripping of water.

When the driver desires to give the dog a drink of water, the driver dispenses water from the bottle by squeezing the opposite sides of the plastic squeeze bottle so that water flows into the bowl through a straw. The driver then maintains the pressure on the squeeze bottle to keep the water in the bowl, enabling a dog to drink as much water as the dog desires, and then releases the squeeze pressure on the squeeze bottle so that the unconsumed water will be sucked back into the bottle. The idea of the present invention dog mug is that it is easy to use any time so a person does not have to pull over and park the car. It can be easily used at a red light and any other area where a legal stop is permitted.

The outer circumference of the mug or drinking bottle is designed to fit into a cup retainer in a vehicle so that it can be safely stored when not in use and water will not flow out or splash out of the inner plastic squeeze bottle.

It is therefore an object of the present invention to provide a safe water retaining vessel which can be retained in a cup holder of a vehicle and which retains the water so that it will not splash out.

It is a further object of the present invention to provide a mechanism by which water in the retaining vessel can be caused to be pushed out of the retaining vessel and into a drinking bowl so that a dog can consume the water, and thereafter enable the unconsumed water to be returned to the retaining vessel without having water splashed on any portion of the interior of the vehicle.

It is an additional object of the present invention to provide a retainer for the water retaining vessel which fits into a standard cup holder in a vehicle so that the water retaining vessel can be safely stored during travel and is easily accessible to the driver to enable the driver to provide his/her dog with a drink of water.

It is also an object of the present invention to provide an aesthetically pleasing water retaining vessel which can be used in a luxury vehicle and any other vehicle which has a cup retaining member adjacent the driver's seat.

It is further object of the present invention to provide a means to prevent water from dripping out of the water bowl with no loss of water if the water bowl is inverted.

Defined in detail, the present invention is a water bottle used in conjunction with water within the water bottle, the water bottle, comprising: (a) a first upper hollow section having a wall with an interior surface and an exterior surface with a first diameter, a second lower hollow section having a wall with an interior surface and an exterior surface with a second diameter, an intermediate recessed hollow section between the upper hollow section and lower hollow section which intermediate recessed hollow section has an inner wall and an outer wall with a third diameter which is less than the first diameter and less than the second diameter, a strap encircling the outer wall of the intermediate hollow recessed section, a base integral with said second lower hollow section, the base having a wall with an interior surface and an exterior surface, the respective interior wall of the base, the second lower hollow section, the interior recessed hollow section and the first hollow section forming an interior water retaining chamber, the upper hollow section including an upper hollow first mating section with an exterior wall and an interior wall surrounding an opening leading the interior chamber, (b) a water bowl having an interior surface surrounding a water retaining interior with an open top, the water bowl including a lower surface with a straw retaining member in fluid communication with the water bottle interior chamber and water retaining chamber, a straw retained by the straw retaining member and extending into the water bottle interior chamber, the water bowl having a second mating member which engages the first mating member to retain the water bowl on the water bottle; (c) the exterior surface of the upper section enabling an inward pressure on the exterior surface toward the water bottle interior chamber to force water within the water bottle interior chamber to enter into the water retaining interior of the water bowl through the straw; and (d) the exterior surface of the lower section enabling an inward pressure on the exterior surface toward the water bottle interior chamber to force water within the water bottle interior chamber to enter into the water retaining interior of the water bowl through the straw Defined more broadly, the present invention is a water bottle used in conjunction with water within the water bottle, the water bottle, comprising: (a) a first upper hollow section having a wall with an interior surface and an exterior surface and being a first size, a second lower hollow section having a wall with an interior surface and an exterior surface being a second size, and intermediate recessed hollow section between the upper hollow section and the lower hollow section which intermediate recessed hollow section has an inner wall and an outer wall and being a third size which is less than the first size and less than the second size, a base integral with said second lower hollow section, the base having a wall with an interior surface and an exterior surface, the respective interior wall of the base, the second lower hollow section, the interior recessed hollow section and the first hollow section forming an interior water retaining chamber, the upper hollow section including an upper hollow first mating member with an exterior wall and an interior wall surrounding an opening leading to the interior chamber, (b) a water bowl having an interior surface surrounding a water retaining interior with an open top, the water bowl including a lower surface with a drain retaining member in fluid communication with the water bottle interior chamber and water retaining chamber, a drain transport member retained by the drain retaining member and extending into the water bottle interior member, the water bowl having a second mating member which engages the first mating member to retain the water bowl on the water bottle; and (c) an enabling member on a surface of the water bottle enabling an inward pressure on an exterior surface of the water bottle toward the water bottle interior chamber to force water within the water bottle interior chamber to enter into the water retaining interior of the water bowl through the water transport member.

Further novel features and other objects of the present invention will become apparent from the following detailed description, discussion and the appended claim, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The present invention has two alternative embodiments which are essentially the same invention with one variation of having a strap in a recessed area and another variation in the nature of the dog bowl on the top of the structure. The configuration of the dog bowl depends upon the size of the dog.

Figure 1:
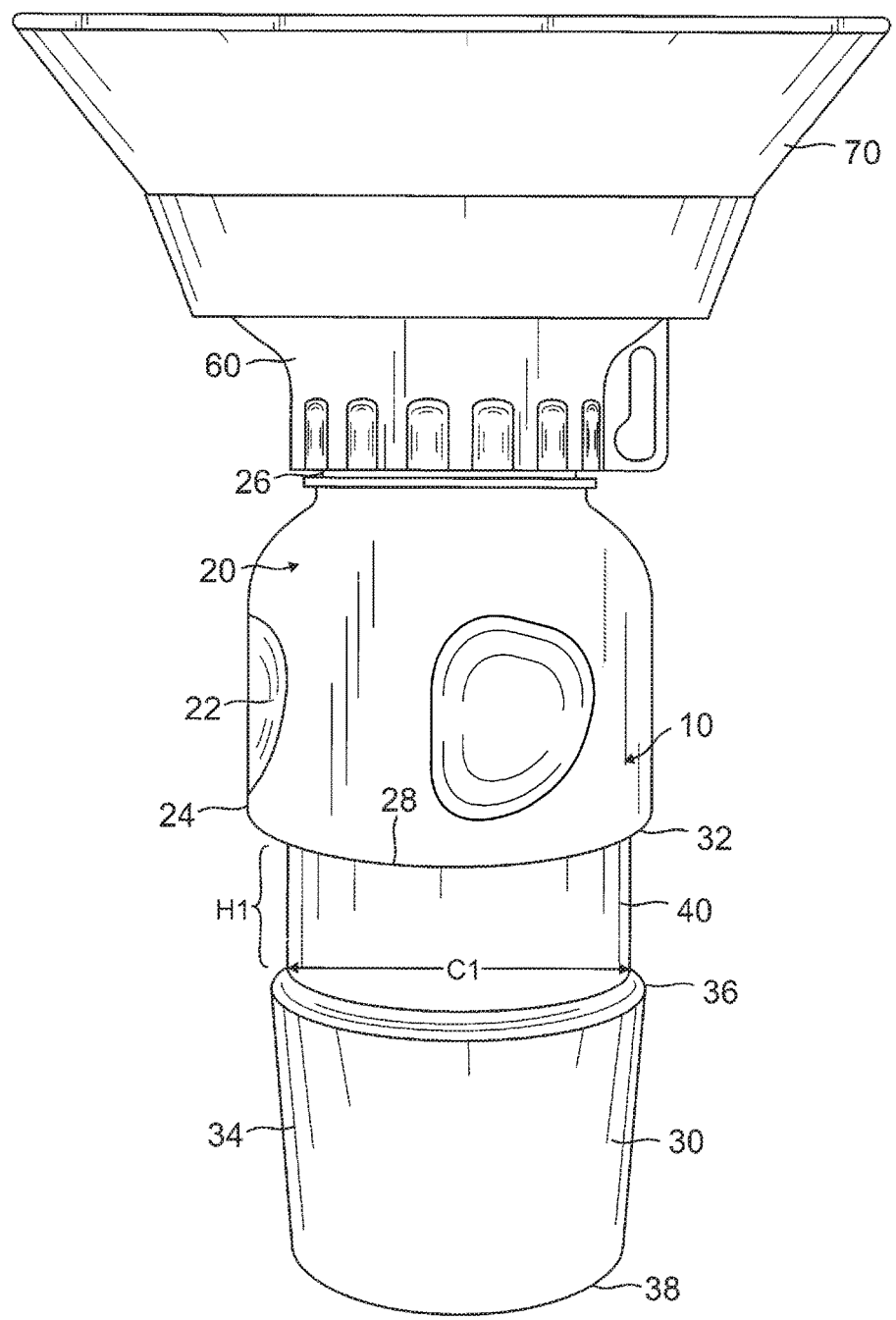
FIG. 1 is a side elevational view of a first embodiment of the present invention including a silicone water bowl and an intermediate connecting section between the silicone water bowl and the water bottle.

Referring to FIG. 1, there is a side elevational view of a first embodiment of the present invention. The present invention water bottle is used to provide a source of water to a dog consists of three sections. The first embodiment 10 comprises a top or upper section 20 which contains within it a multiplicity of detents 22. Only one is shown in FIG. 1 (see FIG. 4A for a better illustration) but it will be appreciated that the detents are a multiplicity of detents which encircle the exterior rim 24 of the upper section 20. There are at least two detents 22 which are disposed approximately 180 degrees apart so that an individual can place two fingers, preferably a thumb in one detent and a forefinger in another detent, and squeeze so that water that is contained within the bottle 60 can be squeezed out through an interior straw and into the dog bowl as will be described. The first alternative embodiment of the water bottle 10 also comprises a lower section 30 which extends from the bottom 38 (see FIGS. 1 and 4A) of the water bottle 10 and extends for a distance so that there is a gap or distance H1 between the lower edge 28 of the upper section 20 and the upper edge 38 of the lower section 30. Between the upper section 20 and lower section 30 is a recessed section 40 which extends for the entire distance H2 and for the entire interior circumference C1 of the recessed section. The recessed section 40 lends stiffening and strength to the bottle 10 so that when it is squeezed, it will not deform. This is a significant improvement and advantage over prior art squeeze bottles which can be deformed once they are compressed.

Figure 2:
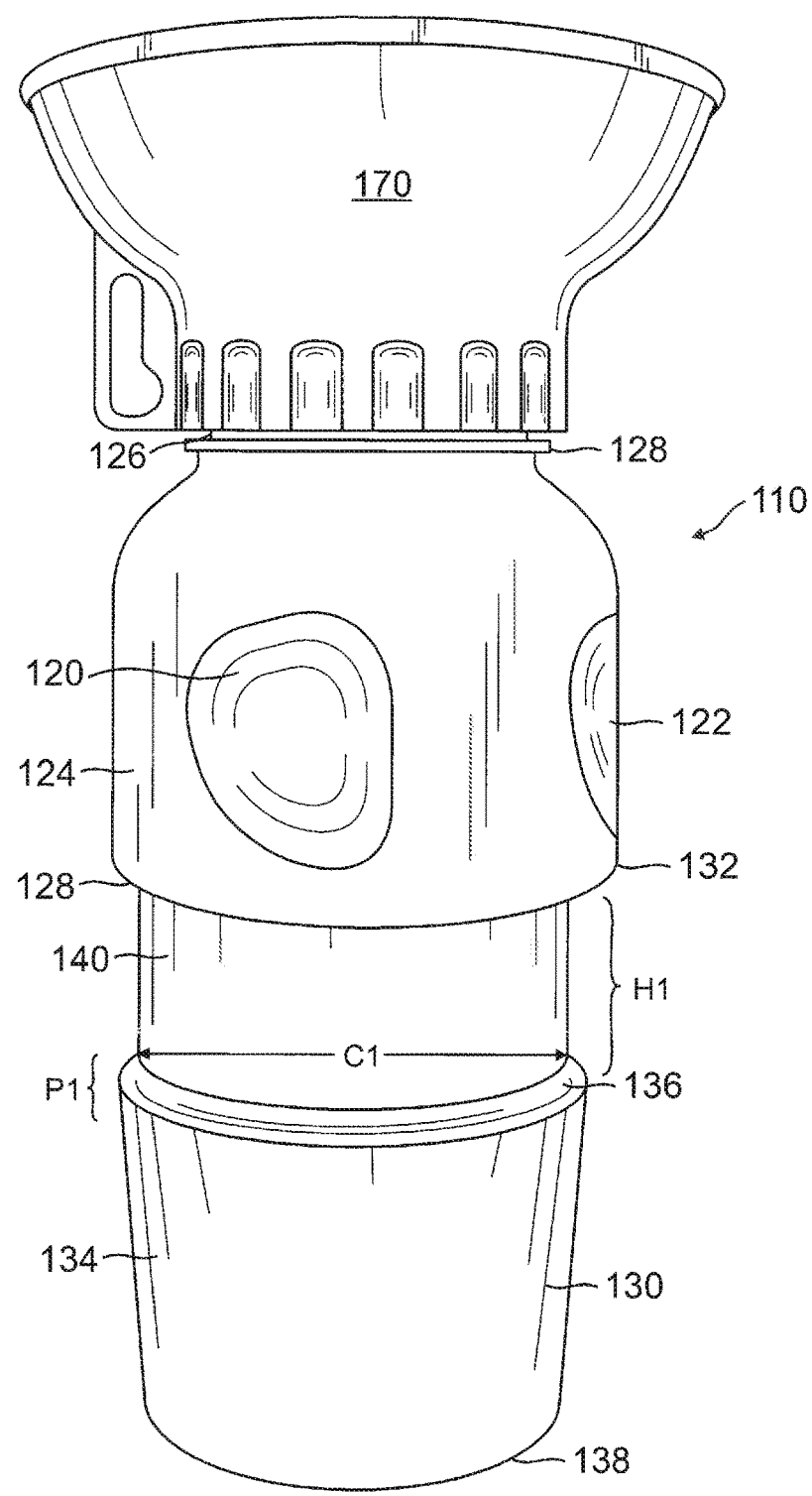
FIG. 2 is a side elevational view of an second embodiment of the present invention wherein the drinking bowl is made of plastic or metal and is directly screwed onto the top of the water bottle.

Referring to FIG. 2, there is a second embodiment of the present invention which essentially has the same components as the first embodiment. The second embodiment 110 has the following components. The second embodiment 110 comprises a top or upper section 120 which contains within it a multiplicity of detents 122. Only one is shown in FIG. 2 but it will be appreciated that the detents are a multiplicity of detents which encircle the exterior rim 124 of the upper section 120. There are at least two detents 122 which are disposed approximately 180 degrees apart so that an individual can place two fingers, preferably a thumb in one detent and a forefinger in another detent, and squeeze so that water that is contained within the bottle 110 can be squeezed out through an interior straw and into the dog bowl as will be described. The second embodiment of the water bottle 110 also comprises a lower section 130 which extends from the bottom 138 of the water bottle 110 and extends for a distance so that there is a gap or distance H1 between the lower edge 128 of the upper section 120 and the upper edge 130 of the lower section 130. Between the upper section 120 and lower section 130 is a recessed section 140 which extends for the entire distance H1 and for the entire interior circumference C1 of the recessed section. The recessed section 140 lends stiffening and strength to the bottle so that when it is squeezed, it will not deform. This is a significant improvement and advantage over prior art squeeze bottles which are deformed once they are compressed. An addition in the second embodiment is the addition of a strap 150 which encircles the recessed section 140 with the strap 150 having an engaging member or metal section 152 which can be clipped to the dog's collar or retained in another location where it is easily accessible. Also, the lower circumference CC1 for the second embodiment 110 and the same lower circumference CCC1 for the second embodiment and the diameter DC1 for the first embodiment and the diameter DC2 for the second embodiment are sized to be able to fit into a cup holder within a vehicle.

Figure 3:
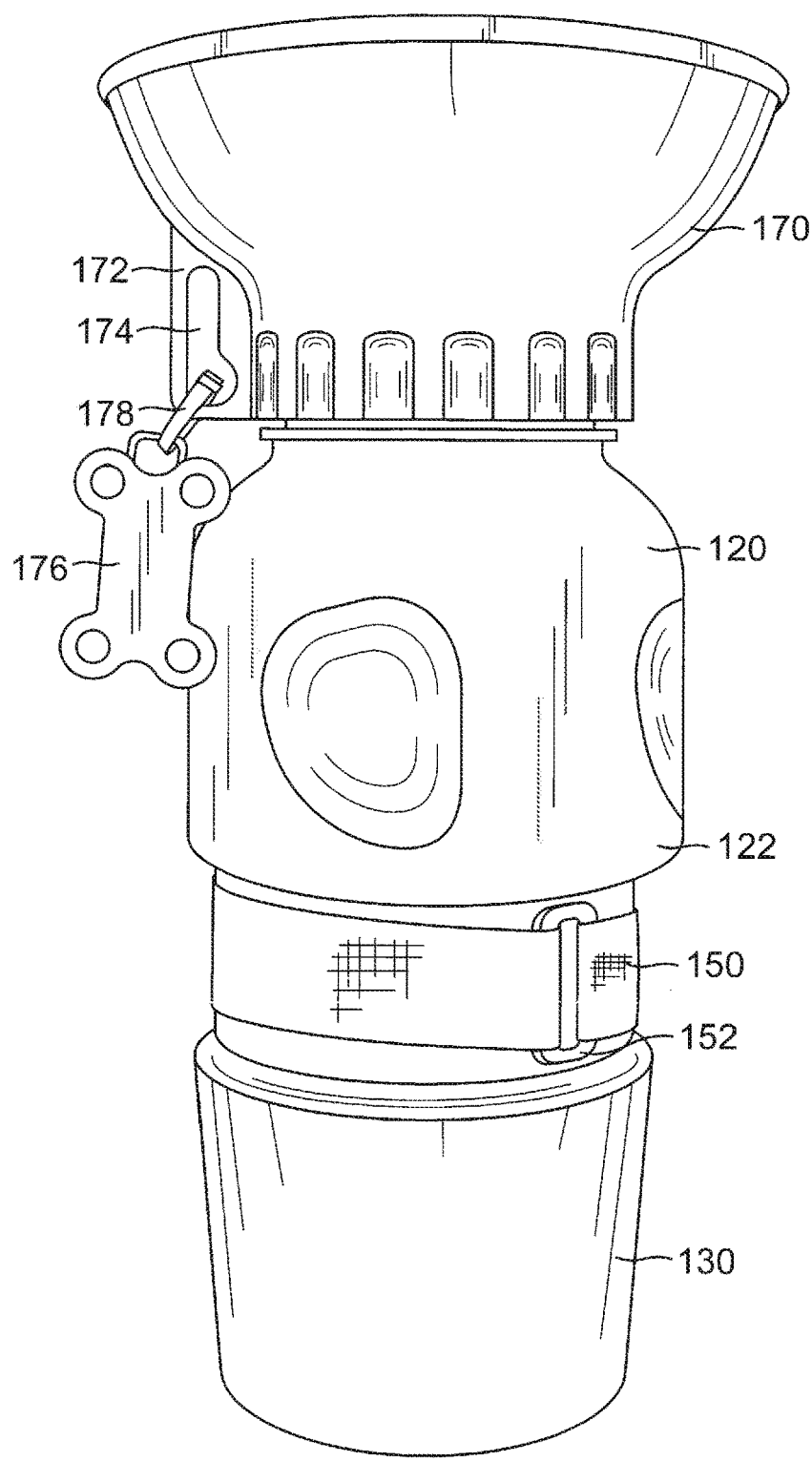
FIG. 3 is a closeup side elevational view of the second embodiment of the present invention illustrated in FIG. 2.

Referring again to FIG. 1, there is a mating section 60 which contains internal threads that are threaded onto the female threads at the opening 180 (see FIG. 6A) of the water bottle 10. Thereafter, the water bowl 70 is shown made of silicone. The silicone water bowl snaps onto the mating member 60. The purpose of having a silicone bowl is that it is wider and more water can be placed in it for larger dogs Referring to FIG. 2, the water bowl 170 is preferably made of metal such as stainless steel and which contains within it internal female threads 126 that are threaded onto the male threads 128 of the water bottle. Referring to FIG. 3, the stainless steel bowl 170 has a protruding section 172 with an opening 174 to retain a dog identification member 176 such as a dog tag affixed by an attaching member 178. This is best illustrated in FIG. 3 which is a side elevational view of the upper section of the second embodiment of the present invention.

Figure 5:
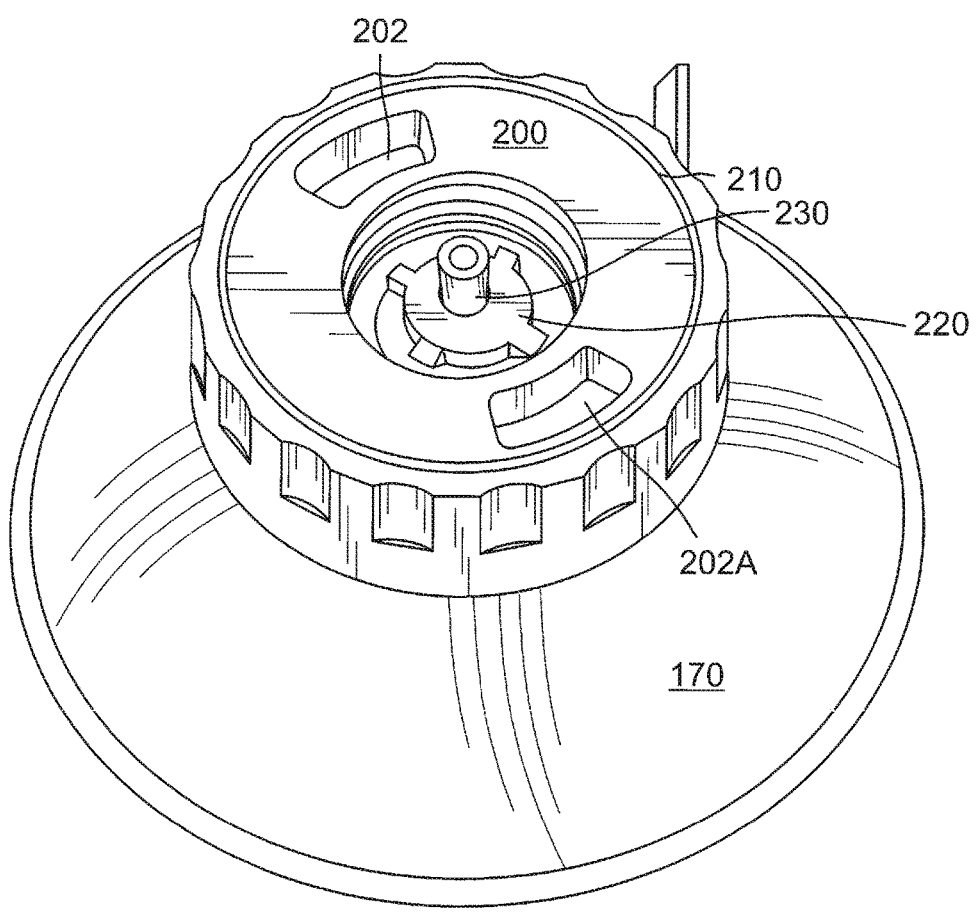
FIG. 5 is a bottom perspective view of the drinking bowl illustrating its interlocking components.
Figure 6B:
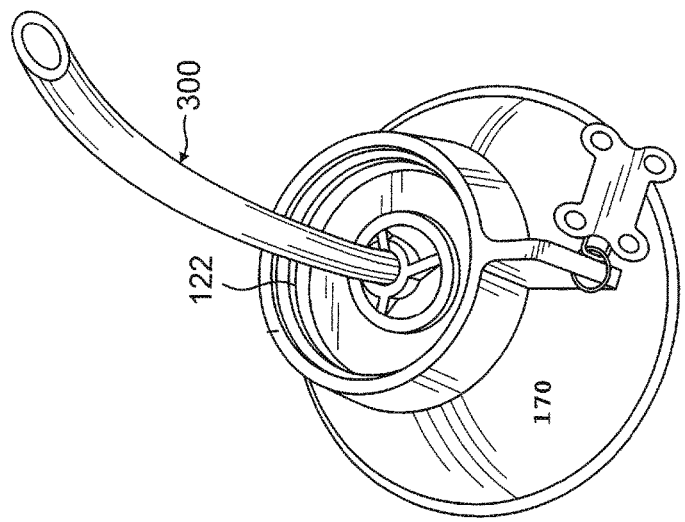
FIG. 6B is a bottom perspective view of the cap of the drinking bowl of the present invention with the straw affixed thereto.
Figure 6A:
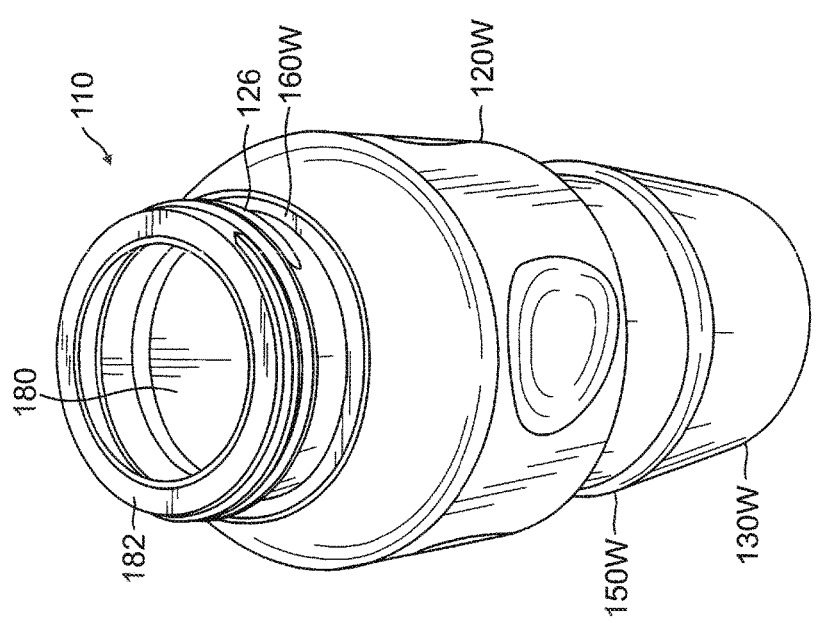
FIG. 6A is a perspective view of a water bottle illustrating the exterior threads at the top of the water bottle and the opening leading to the interior chamber which retains the water.
Figure 7:
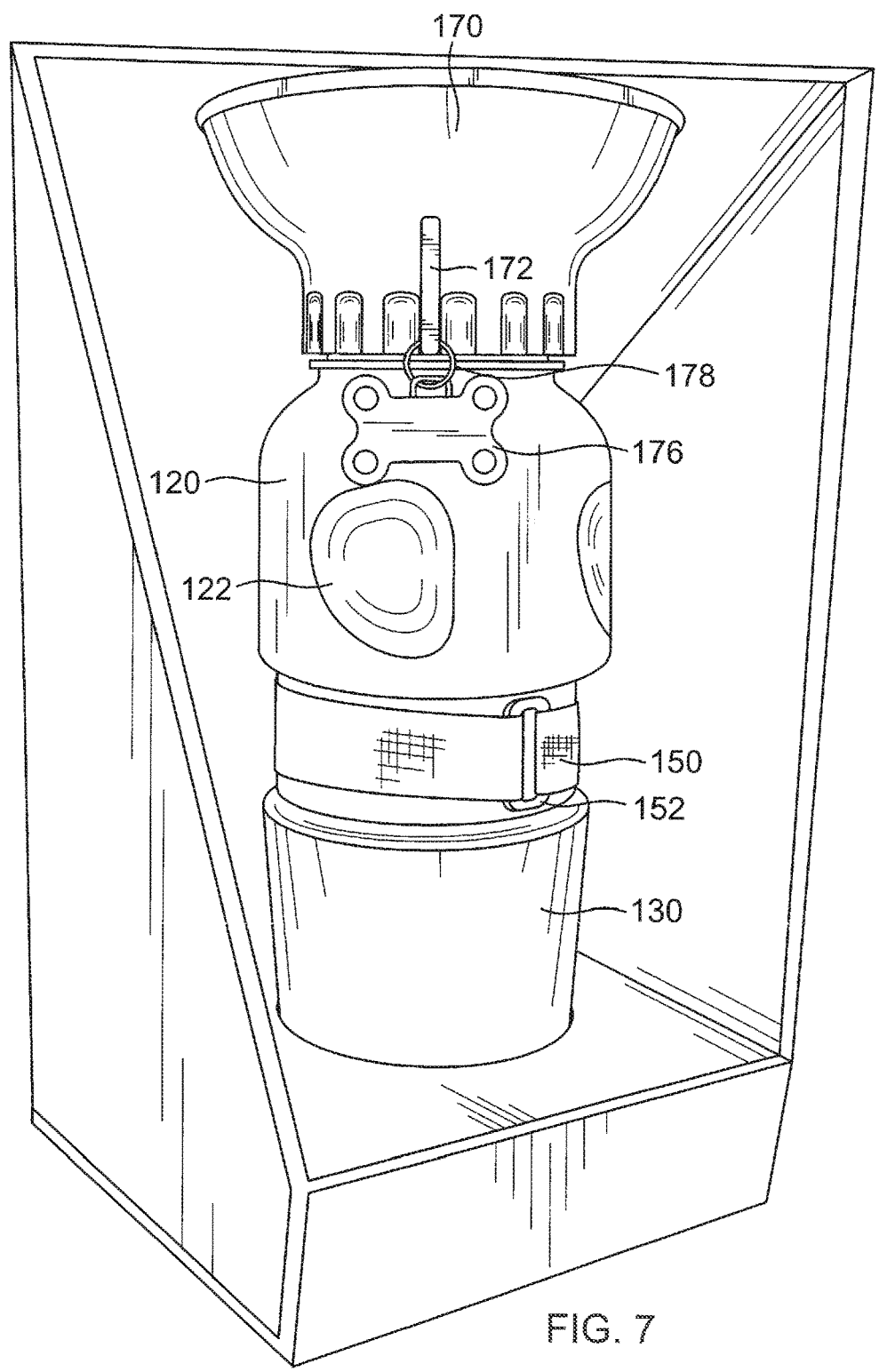
FIG. 7 is perspective view of the second embodiment of the present invention more clearly illustrating its elements and also shown within a shipping box.

Referring to FIG. 6B, there is a bottom perspective view of the water bowl 170 and it is threaded onto the female threads 126 of the top of the bottle as illustrated in FIG. 6A. There is a straw 300 which extends from a straw receiving member 230 (see FIG. 5) which is incorporated into the straw receiving member 220, and the straw 300 extends into the interior chamber 180 of the water bottle 110 that is surrounded by respective walls 120W, 150W and 130W with the threads 122 in water bottle 170 threaded onto thread 126 in top portion in 160W. A gasket 182 surrounds the top of water bottle 110 and with the opening extending into the chamber 180 of the water bottle.

Referring to FIG. 5, there is illustrated an alternative variation of the bottom section of the water bottle 170 wherein the straw retaining member 220 extends to a straw retaining dowel 230 to retain the straw 300. The exterior circumference 210 of the base 200 surrounds locking members 202 and 202A to fit in alternative locking mechanism of the water bottle.

Therefore, through the use of the present invention, both the first and second embodiments, the key improvements are that there is a recessed section (40, 140) between the upper section (20, 120) and lower section (30, 130) to provide stability so that the bottle will not crush or crumble as it is squeezed. The bottle can also be squeezed from the upper section 20 between the dimples 2 and the lower section 30. The bottle also provides for an intersecting member 60 so that a silicone water bowl 70 can be snapped onto the intersection 60. The water bowl which is preferably made of metal such as steel can be threaded onto the exterior threads 26 or 126 of the bottle 110.

Therefore, the present invention is a substantial improvement over existing technology where there is only a water bottle with no exterior cover.

Figure 4A:
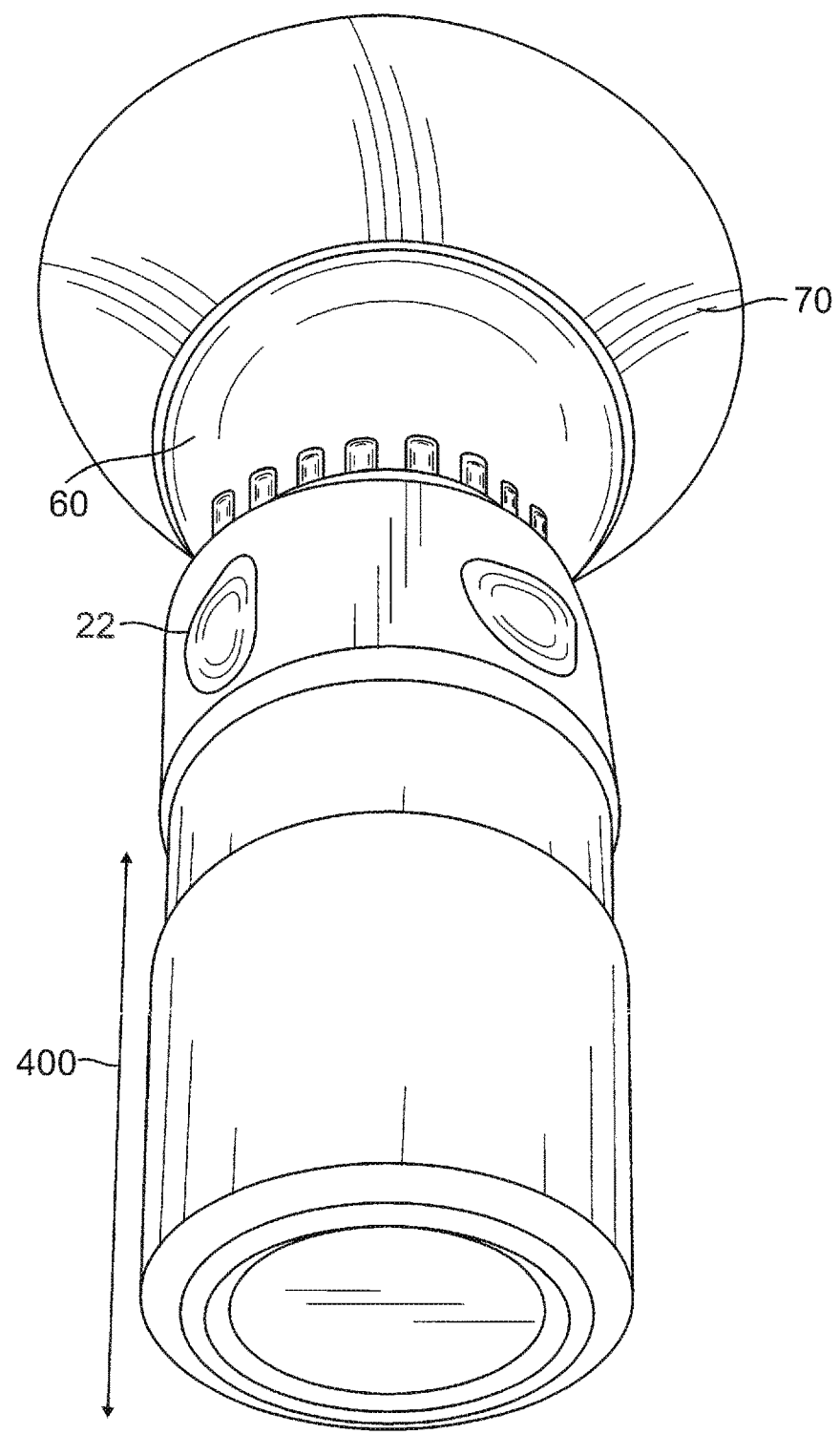
FIG. 4A is a bottom perspective view of first embodiment of the present invention illustrated in FIG. 1.
Figure 4B:
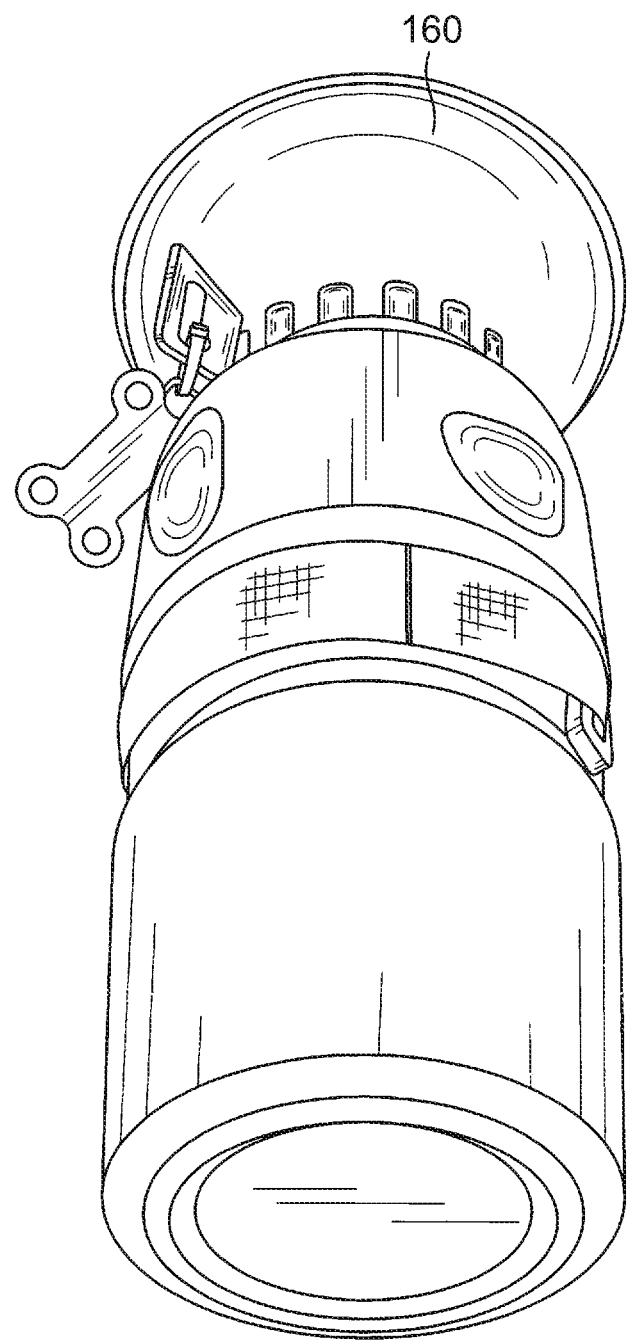
FIG. 4B is a bottom perspective view of second embodiment of the present invention illustrated in FIGS. 2 and 3.

Also, referring to FIG. 4A, a cup 400 which can be retained on the bottom section 30 or 130 of either embodiment 10 or 110 so that the cup 400 can be removed and water can be poured onto the cup 400 and/or into a bowl so that the dog can drink it in addition to squeezing the bottle for water to go into the water bowl.

Therefore, through the present invention there is a significantly improved water bottle which will not be crushed when it is squeezed from the outside and contains various connection members that permit the water bowl to be affixed to the bottle either through a snap member (silicone) for larger dogs or a threaded section for a metal member for smaller dogs.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A portable water travel bottle adapted for use with water, the portable water travel bottle comprising:
  a. a water bottle portion including a first upper hollow section having a wall with an interior surface and an exterior surface with a first diameter, the exterior surface including a multiplicity of dimples with respective combinations of two of said multiplicity of dimples parallel to and oppositely disposed from each other, a second lower hollow section having a wall with an interior surface and an exterior surface with a second diameter, an intermediate stiffening straightening and anti-deformation recessed hollow section having an inner wall with a third diameter which is less than the first diameter and less than the second diameter, a strap encircling the outer wall of the stiffening, strengthening and anti-deformation recessed hollow section, the strap including an engaging member by which the strap is configured to clip to a dog collar, a base integral with said second lower hollow section, the base having a wall with an interior surface and an exterior surface, the respective interior surface of the base, the second lower hollow section, the intermediate stiffening straightening and anti-deformation recessed hollow section and the first upper hollow section forming an interior water retaining chamber, the first upper hollow section integrally formed with and extending to a top portion having an exterior wall and an interior wall surrounding an opening having a diameter of at least 53 millimeters leading to said interior water retaining chamber, said top portion having top portion male mating threads on its exterior surface;
  b. a water bowl including an exterior surface extending to a protruding section with an opening configured to retain a dog tag affixed by an attaching member through the opening in the protruding member, the water bowl also having an interior surface surrounding a water retaining interior section with an open top, a water passage opening in a central bottom of the water retaining interior, the water passage opening extending through the water bowl to a central opening in the exterior surface of the water bowl, a straw receiving member affixed to the exterior surface of the water bowl, the straw receiving member retaining a straw receiving dowel aligned at an open top proximal end with the water passage opening, the straw receiving dowel having an exterior surface sized to retain an interior of a straw, the water bowl having a lower section with an interior sidewall having internal sidewall female threads which engage the male mating threads of the top portion of the water bottle, a silicone gasket retained between the male mating threads and the female mating threads, the gasket located at the top portion of the water bottle, the sealing gasket located at the top portion of the water bottle and creating a sealing gasket when the male mating threads are threaded onto the female mating threads to create a firm watertight gasket seal between the water bowl and the first upper portion of the water bottle, and the straw extending into the water bottle interior water retaining chamber and extending in an open distal end adjacent the interior surface of the base of the water bottle;

c. the multiplicity of dimples on the exterior surface of the first upper hollow section marking finger squeezing locations and enabling an inward pressure on at least two oppositely disposed dimples on the exterior surface of the first upper hollow section toward the water bottle interior water retaining chamber to force water to flow into the straw through its open distal end, through the straw receiving dowel and into the water passage opening in the central bottom of the water retaining interior of the water bowl;

d. the exterior surface of the second lower hollow section enabling an inward pressure on the exterior surface of the second lower hollow section toward the water bottle interior water retaining chamber to force water within the water bottle interior water retaining chamber to enter into the water retaining interior of the water bowl through the straw and the dowel; and e. the combination of the intermediate stiffening straightening and anti-deformation recessed hollow section providing rigidity to the water bottle and preventing the water bottle from deforming when inward pressure is applied to the upper hollow section or lower base section combined with the flow of water within the water bottle interior water retaining chamber flowing into the water retaining interior of the water bowl beginning at a location of a distal open end of the straw, flowing through the straw retained at its proximal end by the straw retaining dowel and through the central opening results in water in the water retaining interior of the water bowl immediately returning to the water bottle interior water retaining chamber when the inward pressure on an exterior surface of the water bottle is removed.

2. The portable water travel bottle in accordance with claim 1 further comprising:

the water bowl is made out of material selected from the group consisting of silicone and stainless steel.

3. The portable water travel bottle in accordance with claim 1 further comprising:

the first upper hollow section, the second lower hollow section, the intermediate recessed hollow section and the bottom of the water bowl are made of plastic.

* * * * *